(12) United States Patent
Hira et al.

(10) Patent No.: US 6,522,373 B1
(45) Date of Patent: Feb. 18, 2003

(54) LIQUID CRYSTAL DISPLAY DEVICE, LIGHT GUIDE PLATE, AND METHOD FOR PRODUCING LIGHT GUIDE PLATE

(75) Inventors: Yasuo Hira, Yokohama (JP); Hitoshi Taniguchi, Yokohama (JP); Toshitsugu Miyawaki, Chonan (JP); Shuji Yano, Toyohashi (JP)

(73) Assignees: Hitachi, Ltd., Toyko (JP); Nitto Denko Corporation, Osaka (JP)

( * ) Notice: Subject to any disclaimer, the term of this patent is extended or adjusted under 35 U.S.C. 154(b) by 0 days.

(21) Appl. No.: 09/558,035

(22) Filed: Apr. 26, 2000

(30) Foreign Application Priority Data

Apr. 30, 1999 (JP) .......................................... 11-124411

(51) Int. Cl.⁷ ............................................. G02F 1/1335
(52) U.S. Cl. .......................................... 349/65; 362/31
(58) Field of Search ............................. 349/65; 362/29, 362/31

(56) References Cited

U.S. PATENT DOCUMENTS

| | | | |
|---|---|---|---|
| 5,339,179 A | * 8/1994 | Rudisill et al. | 349/65 |
| 5,729,311 A | * 3/1998 | Broer et al. | 349/57 |
| 5,961,198 A | * 10/1999 | Hira et al. | 349/65 |
| 6,130,730 A | * 10/2000 | Jannson et al. | 349/64 |
| 6,147,725 A | * 11/2000 | Yuuki et al. | 349/61 |
| 6,256,447 B1 | * 7/2001 | Laine | 349/56 |

FOREIGN PATENT DOCUMENTS

| | | | |
|---|---|---|---|
| DE | 00544332 A1 | * 11/1992 | 349/65 |
| EP | 0 590 511 A | 4/1994 | |
| EP | 0 997 683 A | 5/2000 | |
| JP | 4-162002 | 6/1992 | |
| JP | 6-67004 | 3/1994 | |
| JP | 7-294745 | 11/1995 | |
| KR | 98-024960 | 7/1998 | |

OTHER PUBLICATIONS

LCD, Applied Physics, vol. 67, No. 10, pp. 1159–1162, 1988.

* cited by examiner

*Primary Examiner*—James Dudek
(74) *Attorney, Agent, or Firm*—Antonelli, Terry, Stout & Kraus, LLP

(57) ABSTRACT

A light guide plate which can achieve improvement of back-lighting or front-lighting luminance without increase of luminance of a light source, and a liquid crystal display device using such a light guide plate. A large number of concave small dots are formed in a surface of the light guide plate opposite to a light emitting surface of the light guide plate which emits light to a liquid crystal cell array so that light incident on the light guide plate from the light source is reflected at the concave small dots in the direction toward the light emitting surface of the light guide plate. Each of the concave small dots is shaped like a triangle with a sectional inclination angle of from 50 to 60° in sectional view and shaped like an approximate rectangle or square in plan view in the direction perpendicular to a surface of the light guide plate and disposed so that a long side of the approximate rectangle or a side of the approximate square is approximately parallel with the longitudinal direction of the light source.

19 Claims, 12 Drawing Sheets

FIG.2
CONVENTIONAL
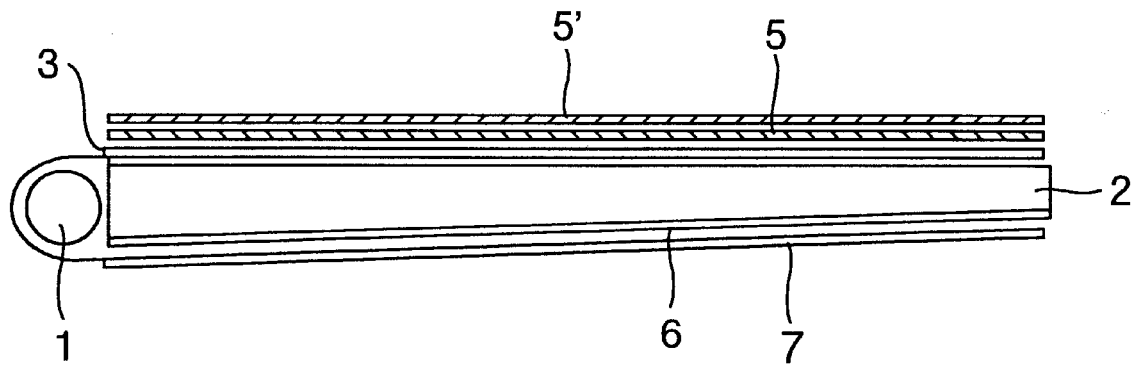
FIG.3
CONVENTIONAL
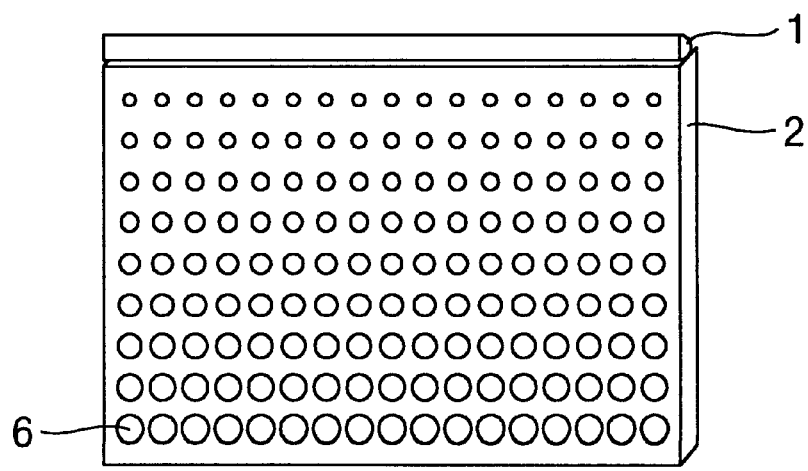

FIG.4
CONVENTIONAL
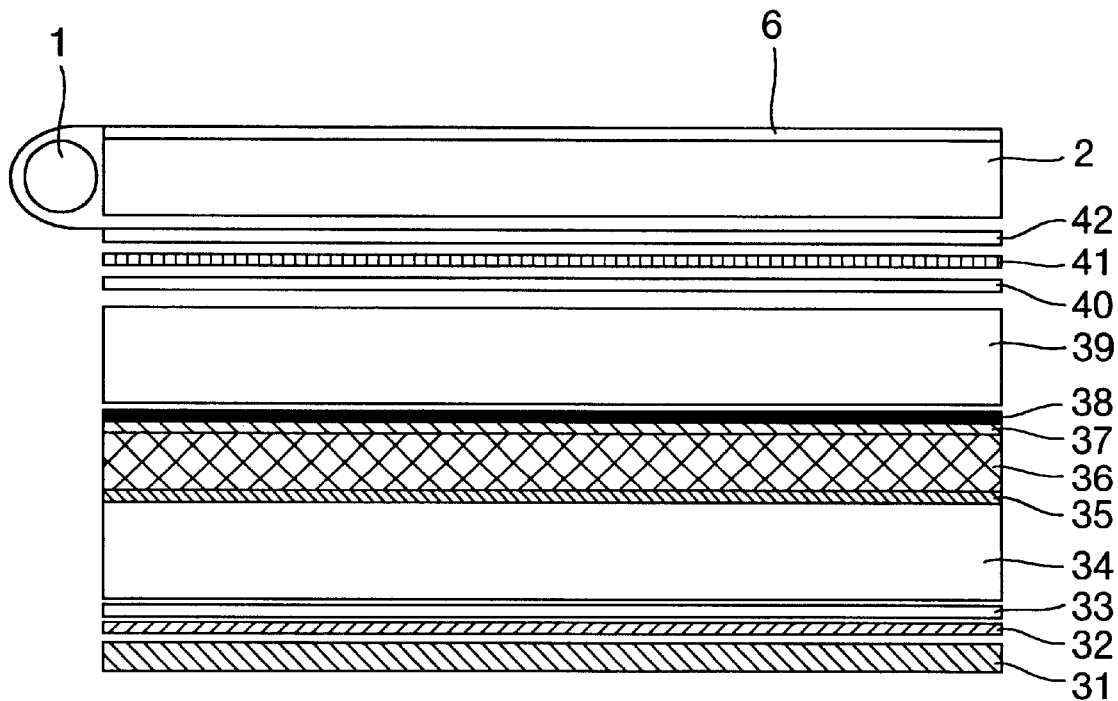

FIG.5
CONVENTIONAL
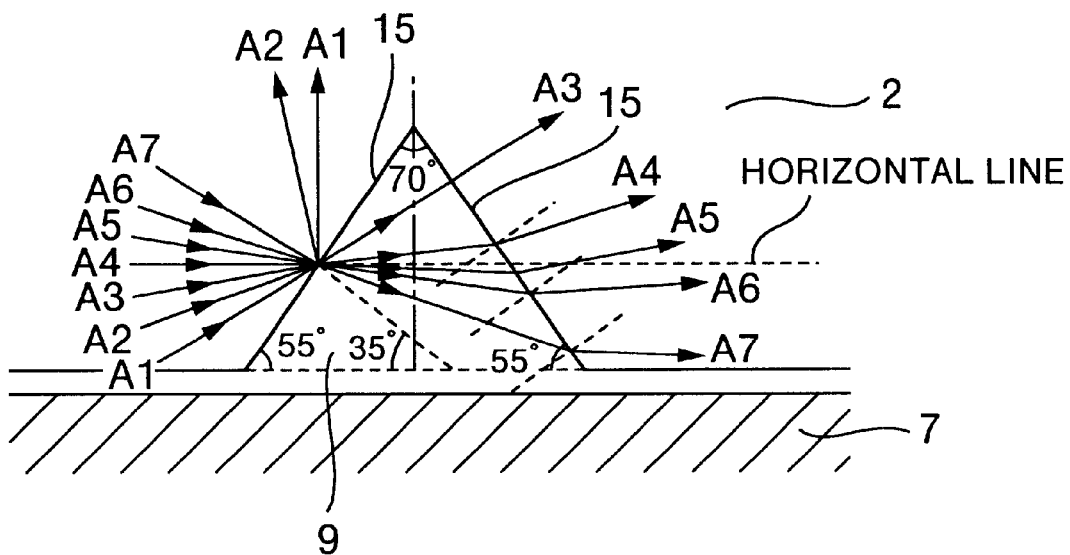

FIG.10

CONCAVE SMALL DOTS

| SECTIONAL SHAPE | TRIANGLE | |
|---|---|---|
| SECTIONAL INCLINATION ANGLE | 50 TO 60° | |
| INCLINATION ANGLE DISTRIBUTION | THE INCLINATION ANGLE DECREASES AS THE POSITION BECOMES NEARER TO THE LIGHT SOURCE. | |
| DEPTH | 1 TO 200 $\mu$M, PREFERABLY 2 TO 100 $\mu$M | |
| PLANAR SHAPE | SQUARE OR RECTANGLE | |
| DENSITY DISTRIBUTION | THE DOT DENSITY DECREASES AS THE POSITION BECOMES NEARER TO THE LIGHT SOURCE. | |
| SHAPE DISTRIBUTION | THE DOT AREA DECREASES AS THE POSITION BECOMES NEARER TO THE LIGHT SOURCE AND AS THE NECESSITY OF SCATTERING LIGHT BECOMES HIGHER. | |
| SIZE — SHORT SIDE | 10 TO 100 $\mu$m | $\leq$0.5 MM$^2$ |
| SIZE — LONG SIDE | $\leq$500 $\mu$m | |
| ARRANGEMENT | RANDOM: WHEN THE PLANAR SHAPE IS A RECTANGLE, THE LONG SIDE OF THE RECTANGLE IS DISPOSED TO BE APPROXIMATELY PARALLEL WITH THE LIGHT SOURCE. | |
| SUBSIDIARY MATERIAL (IF NECESSARY) | REFLECTION PLATE, POLARIZING PLATE, DIFFUSING PLATE, REFLECTION POLARIZING SHEET, PRISM SHEET | |

FIG.12A
RESIST COATING
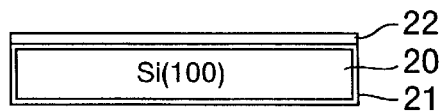

FIG.12B
EXPOSURE AND
DEVELOPMENT
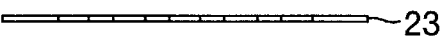

FIG.12C
STICKING OF PROTECTIVE TAPE
ETCHING OF SILICON OXIDE FILM
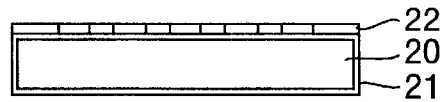

FIG.12D
REMOVAL OF PHOTO RESIST
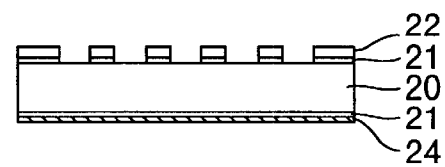

FIG.12E
ANISOTROPIC ETCHING OF
SINGLE-CRYSTAL SILICON
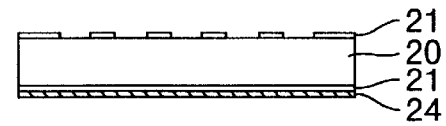

FIG.12F
REMOVAL OF PROTECTIVE TAPE
REMOVAL OF SILICON OXIDE FILM
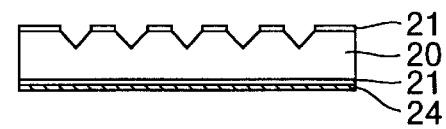

FIG.12G
FORMATION OF CONDUCTIVE
FILM FOR METAL PLATING
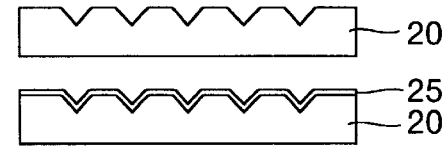

FIG.12H
NICKEL PLATING
(FORMATION OF MASTER STAMPER)
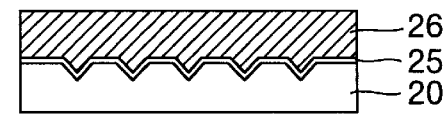

FIG.12 I
FORMATION OF MOTHER STAMPER
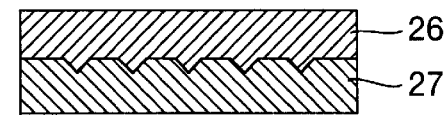

FIG.12J
FORMATION OF STAMPER
FOR MOLDING
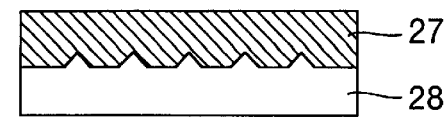

FIG.12K
INJECTION MOLDING
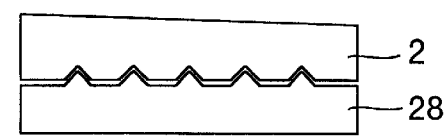

FIG.14

SILICON SUBSTRATE TREATING CONDITIONS

| NO. | STEP | CONDITION |
|---|---|---|
| 1 | FORMATION OF THERMALLY-OXIDIZED FILM ON SILICON WAFER | TEMPERATURE: 1,000°C, WATER TEMPERATURE: 90°C, THICKNESS: 0.5 µM, 31 MIN |
| 2 | BAKING BEFORE RESIST COATING | N2 ATMOSPHERE, 140°C, 30 MIN |
| 3 | PHOTO RESIST COATING | OFPR-8600, 10 CP, 1,000 RPM, THICKNESS: 1 µM |
| 4 | PRE-BAKING | N2, 90°C, 30 MIN |
| 5 | EXPOSURE/DEVELOPMENT | EXPOSURE: 50 MJ, DEVELOPER: NMD-3 |
| 6 | POST-BAKING | N2, 140°C, 30 MIN |
| 7 | OXYGEN PLASMA ASHING | 800 W, 400 SCCM, 3 MIN 45 S |
| 8 | ETCHING OF SILICON OXIDE FILM | DIP, HF:NH4F = 1:7, ETCHING TIME: 6 MIN |
| 9 | STICKING OF PROTECTIVE FILM TO REAR SURFACE | FILM MADE BY NITTO ELECTRIC INDUSTRIAL CO., LTD. |
| 10 | REMOVAL OF PHOTO RESIST | S502A SEPARATING SOLUTION, 110°C, 10 MIN |
| 11 | ANISOTROPIC ETCHING OF SINGLE-CRYSTAL SILICON | 20 % KOH, 1.5 H |
| 12 | REMOVAL OF SILICON OXIDE FILM | DIP, HF:NH4F = 1:7, ETCHING TIME: 6 MIN |
| 13 | CLEANING/DRYING | CLEANING TIME: 5 MIN, PAPER CLEANING |
| 14 | REFORMATION OF THERMALLY-OXIDIZED FILM | TEMPERATURE: 1100°C, WATER TEMPERATURE: 90°C, THICKNESS: 1.0 µM |

LIQUID CRYSTAL DISPLAY DEVICE, LIGHT GUIDE PLATE, AND METHOD FOR PRODUCING LIGHT GUIDE PLATE

CROSS-REFERENCE TO RELATED APPLICATION

This application is related to U.S. patent application Ser. No. 08/938703 entitled "LIQUID CRYSTAL DISPLAY DEVICE", filed on Sep. 26, 1997 is herein incorporated by reference.

BACKGROUND OF THE INVENTION

The present invention relates to a liquid crystal display device, a light guide plate and a method for producing a light guide plate. Particularly, it relates to a technique concerning a light guide plate in a back-lighting type or front-lighting type liquid crystal display device.

A portable computer called lap-top personal computer has been popularized with the advance of miniaturization of a personal computer in recent years. A liquid crystal display device is generally used as a display device in the lap-top personal computer. Color expression of the liquid crystal device has progressed in recent years. A so-called backlighting type liquid crystal display device in which an illuminating means is disposed on the back of a liquid crystal display panel so that a display surface is lit from the back holds the main current of such a liquid crystal display device. A back-lighting means in such a back-lighting type liquid crystal display device needs to light the whole flat surface of the liquid crystal display panel evenly with high and uniform luminance. It may be conceived that luminance of a light source is increased to improve back-lighting luminance. The increase of luminance of the light source is, however, self-limited because it causes increase of electric power consumption and temperature rise in the liquid crystal display device.

There are known various configurations for the back-lighting type liquid crystal display device. For example, the background art includes techniques disclosed in JP-A-4-162002, JP-A-6-67004, etc.

FIG. 2 is a view showing the configuration of the back-lighting means in the conventional back-lighting type liquid crystal display device using an edge-lighting system. In FIG. 2, the reference numeral 1 designates a light source; 2, a light guide plate; 3, a diffusing sheet; 5, a first prism sheet; 5', a second prism sheet; 6, a light scattering layer; and 7, a reflection sheet.

In the configuration shown in FIG. 2, the light source 1 constituted by a lamp such as a cold cathode tube, a hot cathode tube, or the like, is disposed on an edge face of the light guide plate 2 made of a light-transmissible material so that illuminating light emitted from the light source 1 is led into the light guide plate 2. The diffusing sheet 3 made of a translucent white synthetic resin and having a light scattering effect for making luminance of an illuminating surface uniform over the whole surface is provided on an upper surface (light emitting surface) of the light guide plate 2. The first and second prism sheets 5 and 5' for converging scattered light to a certain degree to enhance the frontal luminance of the liquid crystal display device are further disposed on an upper surface of the diffusing sheet 3.

On the other hand, the light scattering layer 6 is provided on a surface (rear surface) of the light guide plate 2 opposite to the light emitting surface of the light guide plate 2 so that light led into the light guide plate 2 is scattered in the direction toward the diffusing sheet 3. The reflection sheet 7 is further disposed on a lower surface of the light scattering layer 6.

The light scattering layer 6 is configured as follows. FIG. 3 is a view showing the configuration of the light scattering Layer 6 depicted in FIG. 2. As shown in FIG. 3, the light scattering layer 6 is formed by printing a plurality of light diffusing substances using titanium oxide, glass beads, or the like, as a predetermined pattern on the rear surface of the light guide plate 2 by a technique of screen printing, or the like. Generally, the intensity of light emitted from the light source 1 decreases as the position of the light becomes farther from the light source 1. Therefore, the light scattering layer 6 is formed so that the pattern area of the light scattering layer 6 in the light guide plate 2 increases as the position becomes farther from the light source 1.

JP-A-7-294745 has proposed also a light guide plate in which grating grooves as an alternative to the aforementioned light scattering layer 6 are formed in a surface (rear surface) of the light guide plate opposite to the light emitting surface of the light guide plate so that light incident on the light guide plate is reflected at the grating grooves.

On the other hand, a reflection liquid crystal display device as described in "Applied Physics; Vol. 67, No. 10, p.1159 (1998)" is known as a technique for achieving a low power-driven liquid crystal display device without use of back-lighting. In such a reflection liquid crystal display device, room light or sunlight taken in is reflected at a layer formed on the back of a liquid crystal and having a reflecting function to thereby achieve elimination of back-lighting. The visibility of the reflection liquid crystal display device is, however, lowered in the dark place. To apply the refection liquid crystal display device to a wider working environment, it is necessary that a measure counter to the lowering of visibility is taken while the characteristic of the reflection liquid crystal display device is kept the best.

A front-lighting type liquid crystal display device as shown in FIG. 4 has been proposed to solve the aforementioned problem. FIG. 4 is a view showing the configuration of a (front-lighting type) reflection liquid crystal display device having a front-lighting means (hereinafter merely referred to as front-lighting type liquid crystal display device).

In FIG. 4, the reference numeral 2 designates a light guide plate; 6, a light scattering layer (formed by screen printing in the same manner as the light scattering layer in FIG. 3) formed on a surface (upper surface in FIG. 4) of the light guide plate 2 opposite to the light emitting surface of the light guide plate 2; and 1, a light source disposed on an edge face of the light guide plate 2. The light source 1 and the light guide plate 2 including the light scattering layer 6 constitute a front-lighting means. In the front-lighting type liquid crystal display device shown in FIG. 4, the light source 1 is not turned on in the bright place and display is watched through the light guide plate 2 of high transparency. In the dark place, the light source 1 is switched on so that the front-lighting means operates in place of external light.

Little scattering, high transparency and smallness in the quantity of light exiting from the upper surface in FIG. 4 are required as performance of the light guide plate in the aforementioned front-lighting type liquid crystal display device. Also in the light guide plate used in the front-lighting type liquid crystal display device, there is known a configuration in which grating grooves as an alternative to the light scattering layer 6 in FIG. 4 are provided in a surface of the light guide plate 2 opposite to the light emitting surface of the light guide plate 2.

In FIG. 4, the reference numeral 31 designates an absorption film; 32, a reflection polarizer; 33, a diffusing film (diffuser); 34, a glass substrate; 35, a thin-film transistor (TFT); 36, a liquid crystal cell array; 37, an LCD electrode; 38, a color filter; 39, a glass substrate; 40, a diffusing film (diffuser); 41, a phase-contrast film; and 42, a polarizer. The detailed description of the respective parts will be omitted because such a front-lighting type liquid crystal display device (the reflection liquid crystal display device having the front-lighting means) configured as described above is commonly known.

The conventional back-lighting type liquid crystal display device as shown in FIGS. 2 and 3 was configured so that light emitted from the light source 1 was led into the light guide plate 2 and scattered by the light scattering substances in the light scattering layer 6. A considerable part of the quantity of light incident on the light guide plate 2 was, however, reflected at the reflection sheet 7 to thereby cause an energy loss. Moreover, a considerable part of the quantity of light incident on the light guide plate 2 exited from the light guide plate 2 horizontally with respect to the liquid crystal display panel so as not to contribute to display. Hence, enhancement of luminance of the liquid crystal display device was limited. That is, there was a predetermined limit on the condition that light led into the light guide plate 2 could be efficiently utilized for display.

Moreover, the light scattering layer 6 was formed by printing light diffusing substances on the light guide plate 2. Hence, steps such as surface treatment (for improving printability of ink) using plasma treatment, screen printing, ultraviolet-curing treatment, etc. were required after injection molding of the light guide plate. A relatively great deal of labor was taken also for the production of the light guide plate 2.

On the other hand, in the conventional back-lighting type liquid crystal display device using the light guide plate provided with the grating grooves formed therein, enhancement of luminance was achieved but there was a problem that moiré was caused by interference between the regular pattern of light exiting from the light guide plate through the grating grooves and the regular pattern of a constituent member, such as a liquid crystal cell array, of the liquid crystal display unit. Hence, there was a disadvantage that a sheet for diffusing light strongly must be additionally used in order to solve the problem. As a result, sufficient enhancement of luminance could not be achieved. Moreover, the grating grooves parallel with the longitudinal direction of the light source were formed to have one and the same sectional shape so as to cross the light guide plate. Hence, in the case of the light guide plate provided with the grating grooves formed therein, it was difficult to obtain uniform luminance over the whole surface of the light guide plate. This was because it was difficult to adjust luminance in the direction parallel with the longitudinal direction of the light source though it was possible to adjust the number and depth of the grating grooves in the direction perpendicular to the longitudinal direction of the light source. Hence, luminance at edge portions of the light guide plate in the direction parallel with the longitudinal direction of the light source became lower than that at a center portion of the light guide plate. There was a problem that it was difficult to make luminance uniform over the whole panel. Moreover, in the case of the light guide plate provided with the grating grooves formed therein, the liquid crystal cell array itself was ununiform in in-plane transmittance. Hence, if the ununiformity of in-plane transmittance was required to be corrected on the light guide plate side, the distribution of back-lighting luminance in the light guide plate provided with the grating grooves formed therein could not be made ununiform intentionally to correct the ununiformity of in-plane transmittance of the liquid crystal cell array.

Moreover, the light guide plate provided with the grating grooves formed therein was produced by injection molding. The production of a mold for molding the light guide plate or the production of a master stamper for producing a stamper for molding the light guide plate was performed by forming the grating grooves one by one by a mechanical cutting operation. Hence, a great deal of time and labor was taken for the production of the mold or master stamper. As a result, this was a barrier to reduction of the cost of the light guide plate.

Further, in the front-lighting type liquid crystal display device, the required characteristics of the light guide plate for front-lighting are as follows.

(1) The haze (turbidity, cloudiness) of the light guide plate is low.

(2) The surface reflectance is low.

(3) The intensity of light exiting from the upper surface in FIG. 4 is small.

(4) The intensity of the vertical component of light exiting from the lower surface in FIG. 4 with respect to the light exiting direction is large.

In the light guide plate having the light scattering layer of the printed light-diffusing substances or in the light guide plate provided with the grating grooves formed therein, however, it was difficult to obtain the light guide plate satisfying the aforementioned characteristics simultaneously. Moreover, in the front-lighting type liquid crystal display device using the light guide plate having the light scattering layer of the printed light-diffusing substances or using the light guide plate provided with the grating grooves formed therein, there was the same problem as that in the aforementioned back-lighting type liquid crystal display device.

SUMMARY OF THE INVENTION

Therefore, a technical theme of the present invention is to solve the problems in the background art. An object of the present invention is to provide a light guide plate which can achieve enhancement of back-lighting or front-lighting luminance without increase of luminance of a light source, and a liquid crystal display device using such a light guide plate.

To achieve the foregoing object, the liquid crystal display device according to the present invention uses a light guide plate provided with a plurality of concave small dots so that the angle of light led into the light guide plate from a light source disposed on a side edge face of the light guide plate is changed efficiently to move the light to a light emitting surface of the light guide plate so that the light exits from the light emitting surface toward a liquid crystal cell array. The shape, shape arrangement, size, distribution, etc. of the concave small dots formed for changing the light travelling direction are made proper. For example, each of the concave small dots is shaped like a triangle with a sectional inclination angle of from 50 to 60° in sectional view and shaped like an approximate rectangle or square in plan view in a direction perpendicular to a surface of the light guide plate and disposed so that a long side of the approximate rectangle or a side of the approximate square is approximately parallel with the longitudinal direction of the light source.

According to the aforementioned configuration, in the case of back-lighting, the quantity of light exiting from the lower surface of the light guide plate toward a reflection sheet is reduced while the quantity of light exiting from the upper surface of the light guide plate toward the liquid crystal cell array is increased. Moreover, the vertical component of the light exiting from the upper surface of the light guide plate toward the liquid crystal cell array is increased. Hence, the luminance of the liquid crystal display device can be enhanced without increase of luminance of the light source. Moreover, the luminance distribution of the liquid crystal display device can be made proper. Hence, visibility can be enhanced. On the other hand, in the case of front-lighting, the quantity of light exiting from the light guide plate directly toward an observer is reduced while light exiting from the light guide plate toward the liquid crystal cell array is increased. Moreover, the quantity of the vertical component of the light exiting from the light guide plate toward the liquid crystal cell array is increased. Hence, the luminance of the liquid crystal display device can be enhanced without increase of luminance of the light source. Moreover, the luminance distribution of the liquid crystal display device can be made proper. Hence, visibility can be enhanced

BRIEF DESCRIPTION OF THE DRAWINGS

FIG. 2 is an explanatory view showing the configuration of a back-lighting means used in a conventional back-lighting type liquid crystal display device;

FIG. 3 is an explanatory view showing a light scattering layer of light scattering substances printed on a rear surface of the light guide plate depicted in FIG. 2;

FIG. 4 is an explanatory view showing a reflection color liquid crystal display device (conventional front-lighting type liquid crystal display device) having a conventional front-lighting means;

FIG. 5 is an explanatory view showing the relation between a concave small dot triangular in section with a sectional inclination angle of 55° and the locus of travelling of light rays in the light guide plate according to an embodiment of the present invention;

FIG. 10 is a table showing a preferred specific example of the concave small dot in the light guide plate according to the embodiment of the present invention;

FIGS. 12A to 12K are explanatory views showing a process for producing the light guide plate according to the embodiment of the present invention;

FIG. 14 is a table showing the conditions for treating the silicon substrate in the process of producing the light guide plate according to the present invention.

DESCRIPTION OF THE EMBODIMENTS

Embodiments of the present invention will be described in detail below with reference to the drawings.

Figure 1:
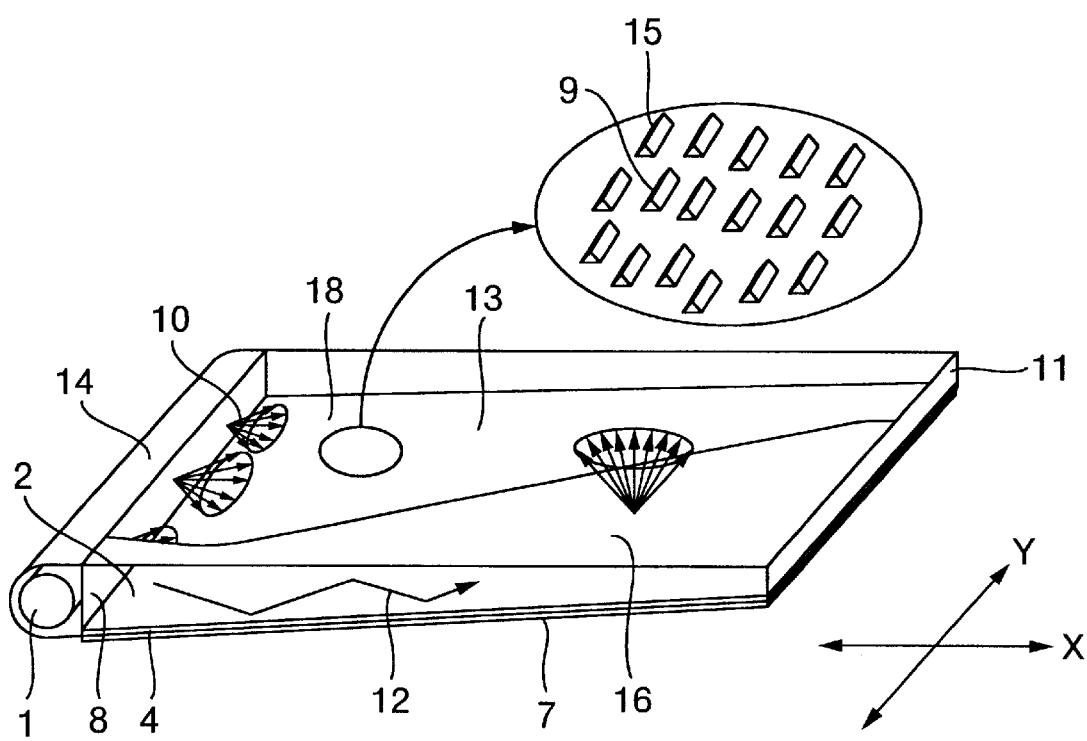
FIG. 1 is an explanatory view showing the configuration of a back-lighting means used in a back-lighting type liquid crystal display device according to an embodiment of the present invention.

FIG. 1 is an explanatory view of back-lighting means used in a back-lighting type liquid crystal display device having an edge-lighting unit according to an embodiment of the present invention. A part of FIG. 1 is a partly enlarged perspective view showing concave small dots formed in a rear surface side of a light guide plate. Incidentally, the back-lighting means in this embodiment has, as smallest unitary components, a light source 1, a light guide plate 2, and a reflection sheet 7.

As shown in FIG. 1, the light guide plate 2 in the back-lighting means is formed so that the thickness thereof becomes smaller as the light guide plate 2 becomes farther from the light source 1. A large number of concave small dots 9 are formed in a surface (which is a rear surface in FIG. 1 on which the reflection sheet 7 is disposed) of the light guide plate 2 opposite to a light emitting surface from which light is emitted to a liquid crystal display unit. Each of the concave small dots 9 is shaped like a rectangle or square approximately in plan view in the direction perpendicular to the light guide plate 2 so that a long side of the approximate rectangle or a side of the approximate square is approximately parallel with the longitudinal direction of the light source 1 (that is, a long side of the approximate rectangle or a side of the approximate square is approximately perpendicular to the X axis in FIG. 1). Each of the concave small dots 9 is formed so that a section thereof viewed along the X axis in FIG. 1 is a triangle with a sectional inclination angle of from 50 to 60°.

In the configuration shown in FIG. 1, light emitted from the slender light source 1 disposed on a side end face (light incident edge face 8) of the light guide plate 2 is collected by a reflector 14. Then, the light is led, as incident light 10, from the light incident face 8 of the light guide plate 2 into the light guide plate 2. Then, the light travels through the light guide plate 2, as guided wave light 12, toward an edge face 11 (the right edge face in FIG. 1) of the light guide plate 2 opposite to the light incident edge face 8 while undergoing repetitive reflections between a rear surface 13 of the light guide plate 2 and the light emitting surface (light-transmissible surface) 16 of the light guide plate 2.

A part of the guided wave light 12 which is incident on inclined surfaces 15 of the concave small dots 9 is reflected at the inclined surfaces 15. The reflected light partially strikes the light emitting surface (light-transmissible surface) 16, whereon the light exits from the light emitting surface 16 after refraction. The light leaving the light guide plate 2 serves as illuminating light which is incident on the liquid crystal cell array after transmission through a diffusing sheet and a prism sheet (not shown). On the other hand, a part of the guided wave light 12 which is transmitted through the rear surface 13 is reflected at the reflection sheet 7 to enter again the light guide plate 2. The light travels in the light guide plate 2 while undergoing repetitive reflections. The light which strikes the concave small dots 9 partially exits from the light emitting surface 16 in the aforementioned manner to serve as light for illuminating the liquid crystal display unit.

Generally, the intensity of light emitted from the light source 1 becomes smaller as the position of the light in the light guide plate 2 becomes farther from the light source 1. Therefore, the density of the concave small dots 9, that is, the number of the concave small dots 9 per unit area is changed correspondingly so that the intensity distribution of the illuminating light, that is, back-lighting luminance becomes uniform over the whole surface of the light guide plate 2. When a single light source is used in the present invention, preferably, the concave small dots 9 are formed so that the density of the concave small dots 9 increases exponentially or by power law in the direction from the light incident face 8 on the light source side toward the edge face 11 on the opposite side.

The reason why light from the light source can be utilized for display efficiently by use of the light guide plate according to the embodiment of the present invention will be described below. Generally, the reflectivity of the reflection sheet 7 is 95%. That is, a light loss of about 5% occurs whenever light is reflected once. In the conventional light guide plate, about a half of light incident on the light guide plate and travelling in the light guide plate exits from the rear surface of the light guide plate toward the reflection sheet and enters again the light guide plate after reflection at the reflection sheet. That is, in the conventional light guide plate, light undergoes repetitive reflections between the light guide plate and the reflection sheet so that a light intensity loss of about 5% occurs whenever light is reflected. Hence, good back-lighting efficiency can be hardly obtained in the conventional light guide plate. On the other hand, in the light guide plate according to the present invention, the quantity of light exiting downward from the inclined surfaces 15 of the concave small dots 9 is small. Hence, the quantity of light incident on the reflection sheet becomes small, so that the loss due to the reflection sheet becomes small. Hence, high-luminance back-lighting can be obtained in the light guide plate according to the present invention.

The above feature of the light guide plate according to the;present invention will be described specifically with reference to FIG. 5. FIG. 5 is a view showing the light guide plate 2 having concave small dots 9 each shaped like a triangle with a sectional inclination angle of 55° in sectional view and the loci of propagation (travelling) of light rays incident on the light guide plate 2.

Light having a divergence angle of about ±35° with respect to the horizontal line shown in FIG. 5 travels in the light guide plate 2. Light incident on the concave small dots 9 triangular in section is reflected and refracted at the inclined surfaces 15. A part of the light reflected at the inclined surfaces 15 exits from the light emitting surface 16 of the light guide plate 2 while the travelling direction is changed upward in FIG. 5, so that the light serves as light for illuminating the liquid crystal display unit. On the other hand, a part of the light transmissibly refracted at one inclined surface 15 once exits to an air layer and then enters the opposite inclined surface 15, at which the light is transmissibly refracted to enter again the light guide plate 2 and travels in the light guide plate 2. The light travelling in the light guide plate 2 is finally reflected at the inclined surfaces of the other concave small dots 9. As a result, the light partially exits from the light emitting surface 16 of the light guide plate 2 so as to serve as light for illuminating the liquid crystal display unit. As described above, in the light guide plate 2 according to the present invention, the quantity of light incident on the reflection sheet 7 disposed, on the rear surface side of the light guide plate 2 is small, so that the loss due to the reflection sheet 7 becomes small. As a result, high efficiency, that is, high-luminance back-lighting can be achieved. In FIG. 5, the reference symbols A1 to A7 denote the loci of travelling of reflected or transmissibly refracted light rays, respectively.

Figure 6:
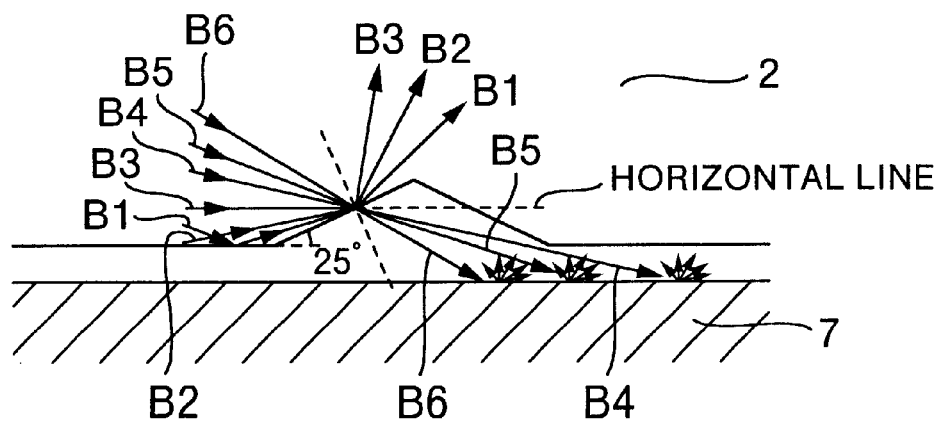
FIG. 6 is an explanatory view showing the relation between a concave small dot triangular in section with a sectional inclination angle of 25° and the locus of travelling of light rays for the sake of comparison with the concave small dot according to the embodiment of the present invention.

On the other hand, when the sectional inclination angle of the inclined surfaces of the concave small dots in the light guide plate 2 is as small as 25 as shown in FIG. 6, light transmissibly refracted at the inclined surfaces of the concave small dots does not return into the light guide plate 2 but enters the reflection sheet 7 to cause an energy loss. In FIG. 6, the reference symbols B1 to B6 denote the loci of travelling of reflected or transmissibly refracted light rays, respectively.

Figure 7A:
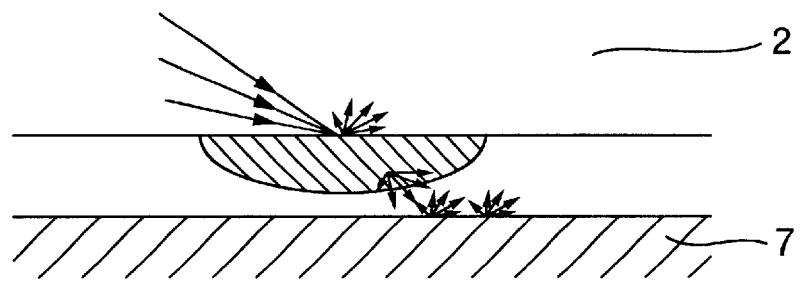
FIGS. 7A to 7C are explanatory views showing the relation between a printed dot and the locus of travelling of light rays, the relation between a concave small dot trapezoidal in section and the locus of travelling of light rays and the relation between a convex small dot and the locus of travelling of light rays, respectively, for the sake of comparison with the concave small dot according to the embodiment of the present invention.
Figure 7B:
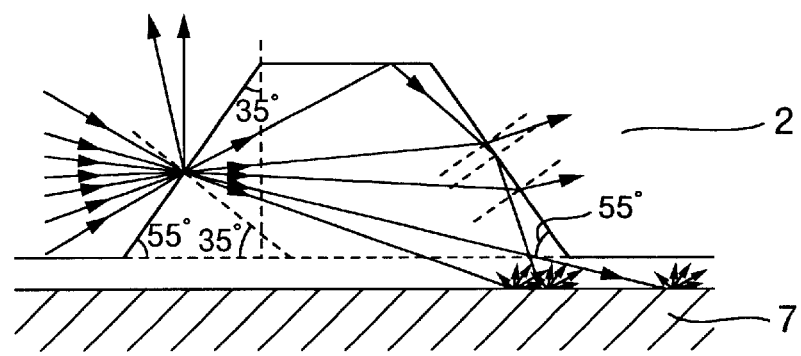
Figure 7C:
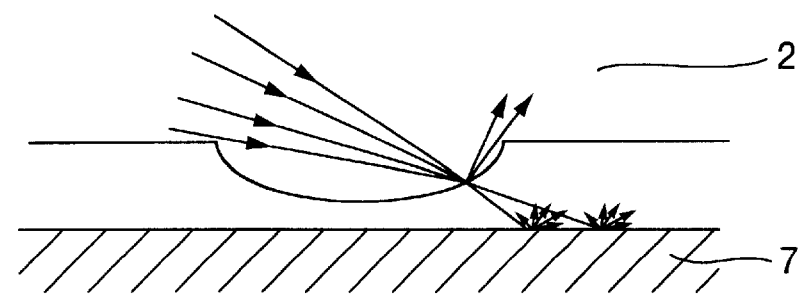

Similarly, in the case of ink-printed dots formed by printing a light-diffusing material as shown in FIG. 7A, in the case of concave small dots each shaped like a trapezoid in sectional view as shown in FIG. 7B or in the case of convex small dots each shaped like a convex in sectional view as shown in FIG. 7C, a considerable part of light incident on the ink-printed dots, the concave small dots trapezoidal in section or the convex small dots does not return into the light guide plate 2 but enters the reflection sheet 7 to cause a light energy loss.

As described above, the back-lighting type liquid crystal display device using the light guide plate according to the embodiment of the present invention has a function that light incident on the light guide plate can exit efficiently to a side (light emitting surface 16) opposite to a surface in which the concave small dots 9 are formed, without the assistance of the reflection sheet compared with the conventional light guide plate. Hence, high back-lighting efficiency and high back-lighting luminance can be achieved.

The functional theory of the light guide plate in the back-lighting type liquid crystal display device can apply to a front-lighting type liquid crystal display device.

Figure 8:
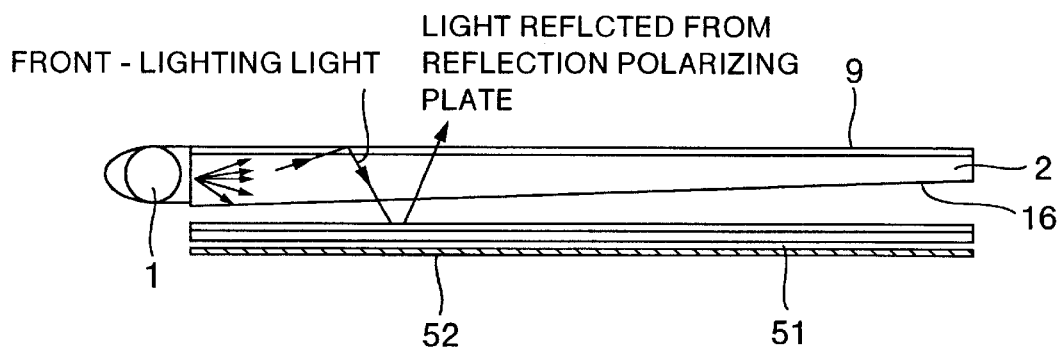
FIG. 8 is an explanatory view showing the configuration of a front-lighting type liquid crystal display device (reflection color liquid crystal display device having a front-lighting means) according to another embodiment of the present invention.

FIG. 8 is a view showing the configuration of a front-lighting type liquid crystal display device having an edge-lighting unit according to another embodiment of the present invention. In the front-lighting type liquid crystal display device, concave small dots 9 with the same shape, arrangement, size and distribution as those in the back-lighting type light guide plate are formed in an upper surface (surface opposite to the light emitting surface 16 from which light exits to the liquid crystal display unit) of the light guide plate 2.

In the front-lighting type liquid crystal display device using the light guide plate 2 according to the embodiment of the present invention, light exits mainly efficiently from the rear surface (light emitting surface 16) of the light guide plate 2 toward a liquid crystal display unit which is constituted by a color filter, a reflection type liquid crystal layer 51, and a reflection polarizer 52. That is, in FIG. 8, the quantity of light (exiting upward directly so as not to go to the liquid crystal display unit) exiting upward from the light guide plate 2 is small, so that the quantity of light exiting downward from the light guide plate, that is, incident on the liquid crystal display unit becomes large. Hence, a front-lighting type reflection liquid crystal display device excellent in light utilizing efficiency with respect to light emitted from the light source 1 and excellent in visibility can be achieved.

Figures 9A, 9B, 9C, 9D:
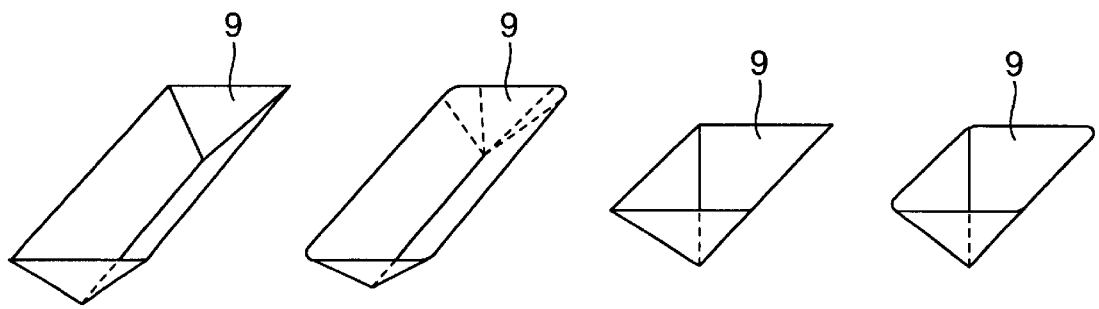
FIGS. 9A to 9D are explanatory views showing examples of the shape of the concave small dot in the light guide plate according to the embodiment of the present invention.

FIGS. 9A to 9D show examples of the shape of the concave small dots 9 formed in the light guide plate 2. Each of the concave small dots 9 is preferably substantially shaped like a rectangle in plan view as shown in FIGS. 9A and 9B or like a square in plan view as shown in FIGS. 9C and 9D.

FIG. 10 is a table collectively showing the best mode of the concave small dots 9 according to an embodiment of the present invention. The sectional shape, sectional inclination angle, inclination angle distribution, depth, planar shape, density distribution, shape distribution, size, arrangement, etc. of the concave small dots 9 are shown specifically in FIG. 10.

The definition of various kinds of parameters, the method for measurement thereof, etc. will be described before the description of the concave small dots 9 according to the embodiment of the present invention with reference to FIG. 10.

Figure 11A:
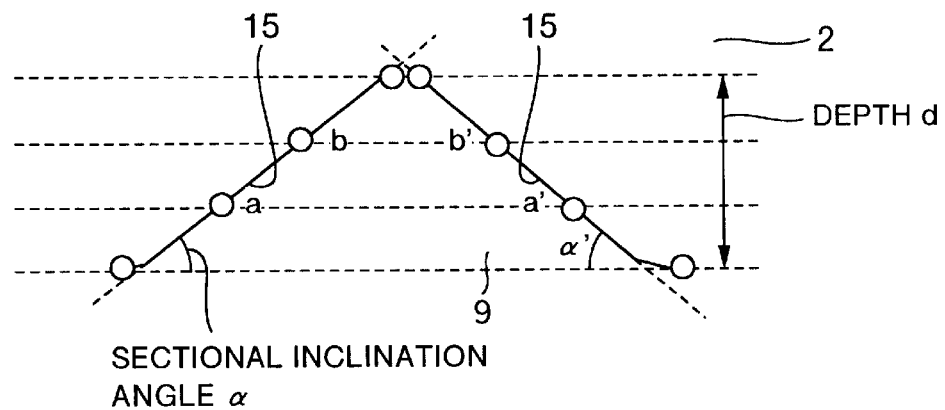
FIGS. 11A and 11B are explanatory views showing the definition of size and angle of the concave small dot in the light guide plate according to the embodiment of the present invention.
Figure 11B:
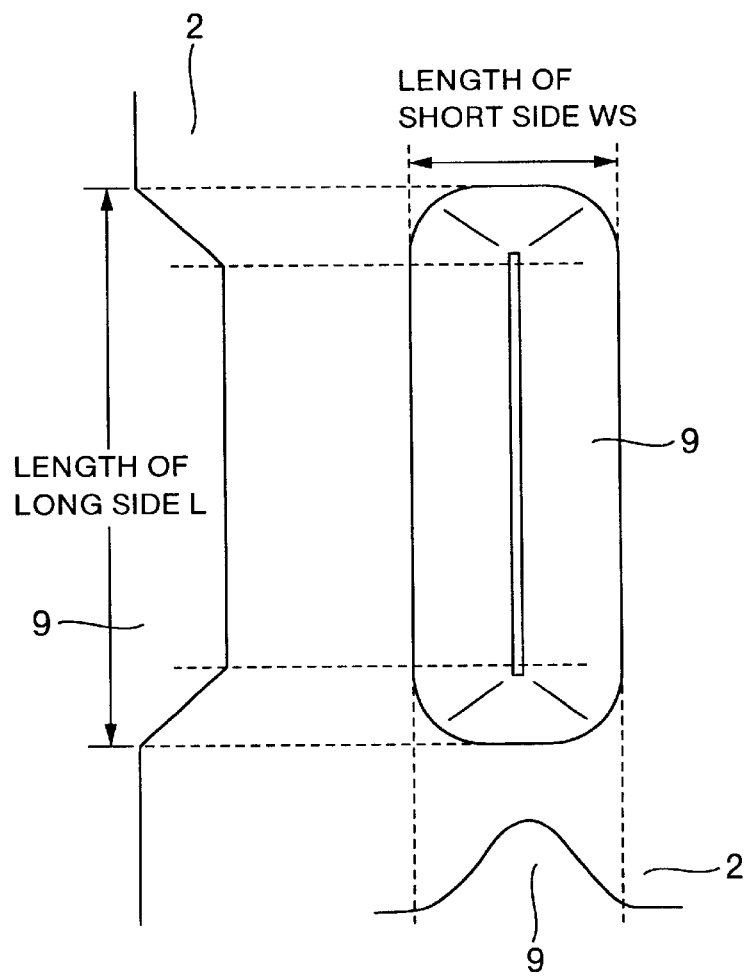

First, the depth d of a concave small dot 9 is defined as shown) in FIG. 11A. That is, the maximum distance between the lower surface of the light guide plate 2 and the bottom surface of the concave small dot 9 is defined as the depth d of the concave small dot 9.

Further, the sectional inclination angles $\alpha$ and $\alpha'$ of the concave small dot 9 are defined as shown in FIG. 11A. That is, the sectional inclination angle $\alpha$ ($\alpha'$) is defined as an angle between the lower surface of the light guide plate 2 and a line segment connecting points a and b (a' and b') at which an inclined surface of the concave small dot 9 intersects horizontal lines dividing the depth d into three equal parts.

When the planar shape of the concave small dot 9 (viewed in a direction perpendicular to the light guide plate 2) is approximately rectangular, the length L of a long side and the length Ws of a short side are defined as shown in FIG. 1B.

A preferred example of the concave small dots 9 will be described specifically in detail with reference to FIG. 10.

First, it is a matter of course that the concave small dots 9 in the embodiment of the present invention are inevitably concave. One reason why the dots are made concave is that the effect of improving luminance is obtained as described preliminarily. Another reason why the dots are made concave is that there is a difference in moldability between the concave shape and the convex shape when the light guide plate 2 is to be produced by plastic molding. That is, this is because fluidity in a region of a mold where a concave small dot is formed becomes good compared with that in a region of the mold where a convex small dots is formed. A surface of the mold corresponding to the convex small dot is concave, so that an air reservoir is apt to be formed at the bottom of the concave portion of the mold when a resin flows. As a result, the transference of the plastic material of the light guide plate onto the mold surface is worsened so that the convex small dot may be formed incompletely. On the other hand, in the case of a concave small dot, the transference of the plastic material onto the mold surface is so good that the concave small dot with a desired shape can be obtained easily.

The surface in which the concave small dots 9 are formed is a surface opposite to the light emitting surface 16 of the light guide plate 2. In the case of back-lighting, the surface in which the concave small dots 9 are formed is a rear surface in FIG. 1. In the case of front-lighting, the surface in which the concave small dots 9 are formed is an upper surface in FIG. 8.

The reason why each of the concave small dot 9 is shaped like a triangle with a sectional inclination angle of from 50 to 60° in sectional view is as described preliminarily with reference to FIG. 5. That is, this is because there is a tendency that the quantity of light exiting from a surface (in which the concave small dots 9 are formed) opposite to the light emitting surface 16 of the light guide plate 2 becomes small whereas the quantity of light exiting from the light emitting surface 16 of the light guide plate 2 becomes large and the quantity of exiting light in a direction perpendicular to the light emitting surface 16 becomes large.

At least a half of the number of the concave small dots 9 are preferably shaped like rectangles or squares approximately in plan view. Preferably, each of the concave small dots 9 is shaped like a rectangle or square approximately in plan view and disposed so that a long side of the approximate rectangle or a side of the approximate square is parallel with the longitudinal direction of the light source 1 such as a cold cathode tube or a hot cathode tube.

The reason why each of the concave small dots 9 is shaped like a rectangle or square approximately in plan view and disposed so that a long side of the approximate rectangle or a side of the approximate square is parallel with the longitudinal direction of the light source 1 is that improvement of luminance is attained by reduction of scattering light in the light guide plate 2. Light emitted from the light source 1 is led from the light incident face 6 of the light guide plate 2 into the light guide plate 2 to travel in the light guide plate 2. A part of the travelling light is incident on the concave small dots 9, and the light travelling direction is changed. As a result, a part of the light incident on the concave small dots 9 exits from the light emitting surface 16 of the light guide plate 2 toward the liquid crystal display unit. On this occasion, it is preferable that the light incident on the concave small dots 9 exits in a direction just or nearly perpendicular to the light emitting surface 16. On the other hand, a large part of the light rays incident on the light guide plate 2 from the light source 1 travel in a horizontal direction approximately perpendicular to the longitudinal direction of the light source 1. Hence, a part of light incident on the inclined surfaces 15 of the concave small dots 9 is reflected at the inclined surfaces 15 and exits from the light emitting surface 16. Accordingly, it is preferable that the inclined surfaces 15 of the concave small dots 9 face the light travelling direction with an area as large as possible so that incident light can exit from the light emitting surface 16 efficiently. To this end, the concave small dots 9 each shaped like a rectangle or square approximately in plan view are disposed so that a long side of the approximate rectangle or a side of the approximate square is parallel with the longitudinal direction of the light source 1. By this arrangement, the light guide plate 2 can be obtained with good reflecting efficiency (light utilizing efficiency) without wasteful increase in the number of the concave small dots 9.

Incidentally, the planar shape of each of the concave small dots 9 is not limited to the aforementioned approximate rectangular or square shape. When each of the concave small dots 9 is shaped like a circle or triangle in plan view in accordance with the region of the light guide plate 2 in order to improve the uniformity of the luminance distribution, good characteristic may be rather obtained.

The size of each of the concave small dots 9 will be described below in the case where the planer shape of the concave small dot 9 is approximately rectangular.

Preferably, the length of a short side of the concave small dot 9 is set to be in a range of from 10 to 100 μm. Preferably, the length of a long side of the concave small dot 9 is set to be not smaller than 1.5 times as large as the length of the short side but not larger than 500 μm. The reason why the lengths of the short and long sides are defined as described above is as follows. When the original form of a concave small dot is formed on a glass master by photolithography, there is a problem that the shape of the concave small dot having a desired contour can be hardly obtained if the concave small dot is set to be thinner than 10 μm. That is, if the size of the concave small dot is reduced, lowering of resolution of a photo mask and lowering of resolution of exposure and development occurs so that the contour of the line of the concave small dot is notched or the surface accuracy of the section thereof is deteriorated. As a result, the light guide plate little in light scattering and high in luminance cannot be obtained. As a measure to solve this problem, there is a method using a high-resolution photo mask and a high-accuracy exposure unit in photolithography. The cost of production of the glass master is, however, so high that any inexpensive light guide plate cannot be provided if the high-resolution mask such as a metal mask and the exposure unit such as a reduction exposure unit are used. When the length of the short side is set to be not smaller than 10 μm, a laser-drawing type film photo mask and an industrially inexpensive close contact type exposure unit can be used so that a glass master and a metal stamper using the glass master can be produced inexpensively.

The reason why the length of the short side is contrariwise defined to be not larger than 100 μm is as follows. If the length of the short side is larger than 100 μm, the widthwise area of the concave small dot 9 in plan view becomes large. As a result, it is confirmed experimentally that visibility (which is a phenomenon that the concave small dot is made visible and that the light guide plate 2 looks like a set of point light sources) of the concave small dot occurs and that adjacent concave small dots 9 overlap each other.

The reason why the length of the long side is set to be not smaller than 1.5 times as large as the length of the short side is as follows. That is, this is because the number of the concave small dots 9 is prevented from increasing wastefully. More specifically, this is because adjacent concave small dots 9 are prevented from overlapping each other so that the area of the inclined surfaces 15 of the concave small dots 9 effective for changing the light travelling direction is increased without increase in the number of the concave small dots.

The reason why the length of the long side is limited to be not larger than 500 μm is as follows. If the length of the long side is larger than 500 μm, the size of the concave small dots 9 becomes too large. As a result, it is confirmed experimentally that the dignity and quality of back-lighting or front-lighting are lowered because of visibility of the concave small dots. That is, if the size of the concave small dots 9 is large, the concave small dots serving as bright spots for back-lighting or front-lighting can be recognized by eye observation when the liquid crystal display device is viewed at close range. As a result, the dot visibility is a barrier to recognition of characters and pictures displayed by the liquid crystal display device.

The arrangement of the concave small dots 9 in accordance with the size thereof will be described below.

The size of a concave small dot 9 in a center portion of the light guide plate 2 as viewed in a direction (Y direction in FIG. 1) parallel with the longitudinal direction of the light source 1 is preferably set to be smaller than the size of a concave small dot 9 in opposite edge portions of the light guide plate 2 as viewed in the Y direction. This is because the luminance distribution in a direction (Y direction in FIG. 1) parallel with the longitudinal direction of the light source 1 is made uniform.

Generally, if the size of the concave small dots 9 is made constant, the luminance in the opposite edge portions of the light guide plate 2 as viewed in the Y direction (see FIG. 1) is reduced compared with that in the center portion of the light guide plate 2. This is because the supply quantity of light from the light source 1 to the opposite edges of the light guide plate 2 as viewed in the Y direction is relatively reduced compared with the supply quantity of light to the center portion of the light guide plate 2 as viewed in the Y direction. To solve this problem, in the prior art, the luminance in the center portion was reduced intentionally to enhance relatively the luminance in the opposite edge portions as viewed in the Y direction to thereby make the luminance distribution uniform over the whole light guide plate 2. This was a bottleneck to enhancement of the luminance for back-lighting or front-lighting.

On the other hand, in the embodiment of the present invention, the size of a concave small dot 9 in the center portion as viewed in the Y direction is set to be smaller than the size of a concave small dot 9 in the opposite edge portions as viewed in the Y direction. Hence, the total value of the areas of inclined surfaces at opposite edges of the concave small dot 9 as viewed in the Y direction is increased in the center portion of the light guide plate 2 as viewed in the Y direction. Hence, a component of light travelling in a direction parallel with the longitudinal direction of the light source 1 is increased in terms of vector. That is, the quantity of light in the center portion of the light guide plate 2 as viewed in the Y direction is fed to the opposite edge sides of the light guide plate 2 as viewed in the Y direction. As a result, the luminance distribution is made uniform over the whole light guide plate 2 (the whole liquid crystal display unit). In this manner, the uniformity of the luminance distribution can be achieved without lowering of the luminance.

Further, the size of a concave small dot 9 on the upstream side of the light guide plate 2 as viewed in the light travelling direction may be set to be smaller than the size of a concave small dot 9 on the downstream side of the light guide plate 2. This contributes also to the uniformity of the luminance distribution over the whole light guide plate 2 (the whole liquid crystal display unit). This is because the luminance on the downstream side of the light guide plate 2 as viewed in the light travelling direction becomes lower than the luminance on the upstream side when the size of the concave small dots is made constant.

The distribution of the density of the concave small dots 9 (the distribution of the number of the concave small dots per unit area) will be described below.

To achieve the uniformity of the luminance distribution, the density of the concave small dots 9 is made smaller as the concave small dots 9 are nearer to the light source 1, that is, as the concave small dots 9 are nearer to the upstream side in the light travelling direction.

To achieve the uniformity of the luminance distribution, the density of the concave small dots 9 in the center portion of the light guide plate 2 as viewed in the Y direction is also set to be lower than that in the opposite edge portions of the light guide plate 2 as viewed in the Y direction. Further, part or all of the planar shapes of the concave small dots 9 formed at the opposite edges of the light guide plate 2 as viewed in the Y direction may be provided as other small-area shapes such as squares, circles, triangles, or the like, than rectangles as occasion demands.

Further, it is effective that the concave small dots 9 are arranged individually at random over the whole surface of the light guide plate 2. The reason therefor is as follows. The concave small dots in the present invention are fine. Hence, when the individual arrangement of the concave small dots 9 is irregular, the irregular pattern of the concave small dots 9 interferes with the regular pattern of other constituent members such as a liquid crystal cell array, a color filter, a TFT pattern, a black stripe, etc. of the liquid crystal display unit so that moire can be prevented from occurring.

The proper value of the depth d of each of the concave small dots 9 will be described below. The preferred depth d of each of the concave small dots 9 is in a range of from 1 to 200 μm, particularly from 1 to 100 μm.

The reason why the depth d of each of the concave small dots 9 is set to be not smaller than 1 μm is as follows. If the depth d is smaller than 1 μm, the area of the inclined surfaces 15 of the concave small dot 9 is reduced. Hence, the function of changing the direction of travelling of light rays incident on the light guide plate 2 is reduced so that the exiting efficiency of light from the light emitting surface 16 of the light guide plate 2 can be hardly enhanced to a value not smaller than a predetermined value.

On the other hand, the reason why the depth d of each of the concave small dots 9 is set to be not larger than 200 μm is as follows. If the depth d is larger than 200 μm, the quantity of exiting light on the upstream side of the light guide plate 2 as viewed in the light travelling direction becomes too large. As a result, correction for achieving the uniformity of the luminance distribution is hardly performed, so that the uniformity of the luminance over the whole light guide plate 2 has a tendency to decrease.

The sectional inclination angles of the concave small dots 9 will be described below.

As described preliminarily, the sectional inclination angles of the concave small dots 9 are defined as α and α' in FIG. 11A. Each of the sectional inclination angles α and α' is preferably in a range of from 50 to 60°, particularly from 53 to 57°. This is because the reflecting function for changing the light travelling direction is so large that the transmitted light is suppressed easily, resulting in high luminance.

A method for producing the light guide plate to be used in the back-lighting type or front-lighting type liquid crystal display device according to the embodiment of the present invention will be described below.

The light guide plate in the embodiment of the present invention is produced basically by plastic molding after a mold is produced. As a method for producing the mold, there can be used any machining method such as drilling, cutting, grinding, or the like. Electrical discharge machining is also used as an effective means. In the present invention, however, the number of the concave small dots in the light guide plate is in a range of from 200 to 20,000/cm$^2$ according to the general design, so that the number of the concave small dots may be larger than 1,000,000 in total on the whole light guide plate. That is, the number of the concave small dots may be enormous. Therefore, the following method may be preferably used.

FIGS. 12A to 12K are process views showing an example of the method for producing the light guide plate 2 according to the embodiment of the present invention.

The method shown in FIGS. 12A to 12K has the steps of:

(1) applying a primer on a silicon substrate 20 covered with a silicon oxide film 21 to thereby achieve enhancement of adhesive property of a photo resist;

(2) forming a photo resist 22 on the silicon substrate 20 (FIG. 12A);

(3) disposing a photo mask 23 having a pattern of concave small dots onto the silicon substrate 20 and irradiating the,silicon substrate 20 with ultraviolet rays (UV) from above the photo mask 23 (that is, selectively curing the photo resist 22 by exposure) (FIG. 12B);

(4) developing the photo resist 22 (removing an uncured portion of the photo resist 22) to thereby form a pattern of concave small dots by means of the photo resist 22 on the silicon substrate 20 (FIGS. 12B and 12C);

(5) sticking a protective tape 24 onto a predetermined surface of the silicon substrate 20, and etching the silicon oxide (SiO$_2$) film 21 to thereby form a pattern of concave small dots by means of the silicon oxide film 21 (FIG. 12C);

(6) removing the residual photo resist 22 (FIG. 12D);

(7) anisotropically etching a surface of the silicon substrate 20 with the silicon oxide film 21 as a mask (FIG. 12E);

(8) removing the silicon oxide film 21 after removing the protective tape 24 (FIG. 12F);

(9) forming a conductive film 25 for metal plating on the silicon substrate 20 (FIG. 12G);

(10) applying the metal plating onto the conductive film 25 as an electrode and then separating metal plating (Ni plating) to thereby obtain a master stamper 26 (FIG. 12H);

(11) forming a very thin-film separator layer (which is a microfilm separator layer as thin as can undergo electroplating) on a predetermined surface of the master stamper 26, plating the master stamper 26, and then separating the master stamper 26 to thereby obtain a mother stamper 27 (FIG. 12I);

(12) forming a very thin-film separator layer (which is a microfilm separator layer as thin as can undergo electroplating) on a predetermined surface of the mother stamper 27, plating the mother stamper 27, and then separating the mother stamper 27 to thereby obtain a stamper 28 for molding (FIG. 12J);

(13) finally polishing a concave small dot-forming surface of the stamper 28 for molding, as occasion demands;

(14) polishing a rear surface (opposite to the concave small dot-forming surface) of the stamper 28 for molding; and

(15) attaching the stamper 28 for molding to an injection molding equipment, and performing injection molding to thereby obtain a light guide plate 2.

In the aforementioned production steps, it is very important that the step of applying a primer as an agent for enhancement of adhesion between the silicon substrate 20 and the photo resist, is carried out before the photo resist 22 is formed. In the primer coating method, properly, a silane type agent is used as the primer. A specific example of the silane type agent is hexamethylsilazane. A gas diffusing method is preferably used as a method for applying the hexamethylsilazane. The gas diffusing method is a method for forming a thin film on a substrate surface by vaporizing hexamethylsilazane which is put in a vessel. The gas diffusing method is the most suitable for forming a uniform film.

A positive/negative liquid or film material may be used as a material of the photo resist. In the example shown in FIGS. 12A to 12K, there are shown the steps in the case where a positive material is used. As a method for forming the photo resist, there is a spin coating method or a roll coating method.

A chrome mask, a film mask or an emulsion mask may be used as the photo mask 23. Data of the shape, size, number, distribution, etc. of the concave small dots are generated in advance, so that the photo mask 23 can be formed by drawing by means of an electron beam, a laser beam, or the like.

Figure 13:
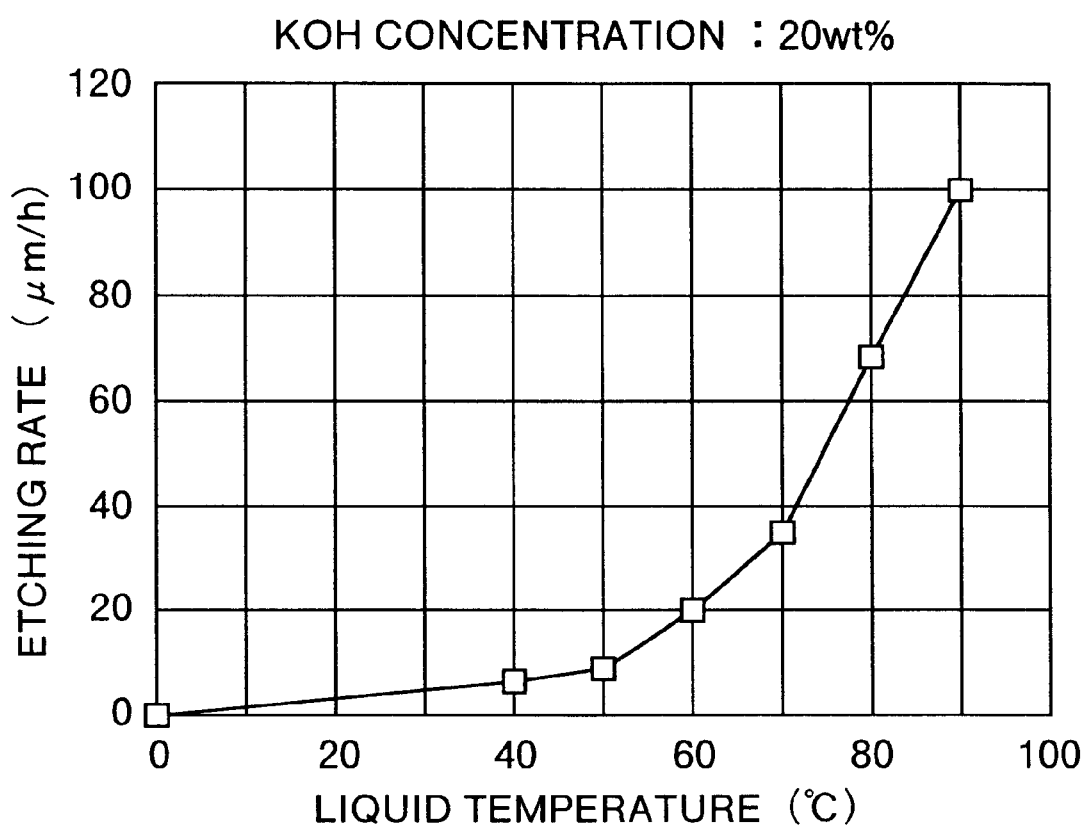
FIG. 13 is an explanatory graph showing the rate of anisotropic etching of single-crystal silicon.

Anisotropic etching of silicon will be described below. The use of anisotropic etching of single-crystal silicon is very effective for forming concave small dots each having a triangular sectional shape according to the present invention. This etching technique utilizes the difference between etching rates due to the crystal orientation of a silicon crystal. A crystal having a (100) face is used as the silicon crystal substrate. A KOH aqueous solution is used as an etching solution. The suitable concentration of KOH is 20%. FIG. 13 shows the etching rate of the (100) face. By etching in the aforementioned condition, concave small dots each having a section shaped like an isosceles triangle with a sectional inclination angle of about 55° can be formed.

FIG. 14 is a table collectively showing a specific example of the condition for machining the silicon substrate 20.

If the conductive film 25 for metal plating is formed before the formation of the plating layer (master stamper) 26, irregularity in the plating step is eliminated so that the master stamper 26 can be formed as a good plating layer. A sputter film such as a nickel thin film can be used as the conductive film 25 for metal plating. The thickness of the conductive film 25 is a very important parameter. If the conductive film 25 is made thick, there is a problem that the film is separated when plating is being carried out. In the production method according to the present invention, it is important to control the thickness of the conductive film 25 to be in a range of from 150 to 350 Å, particularly from 200 to 300 Å. If the thickness of the conductive film 25 is smaller than 150 Å, a uniform plated sheet cannot be produced when plating is carried out. If the conductive film 25 for metal plating is formed to be thicker than 350 Å, there is a problem that the conductive film or the pattern of concave small dots is separated when plating is carried out. As a result, the good master stamper 26 cannot be obtained.

Any suitable metal may be used as a material for the conductive film 25 and the plating layer (master stamper) 26. Especially, nickel is the most suitable one from the point of view of uniformity and mechanical performance. The plating layer (master stamper) 26 obtained can be separated physically easily from the silicon substrate 20.

It is of importance that the concave small dot-forming surfaces of the obtained master stamper 26, the mother stamper 27 and the stamper 28 are polished to obtain a high-luminance light guide plate 2. Especially, polishing of the master stamper 26 is important because the polishing determines the surface roughness of the mother stamper 27 and the stamper 28. The polishing may be performed by hand or mechanical lapping with use of alumina or diamond abrasive grains having a mean grain size in a range of from 0.1 to 1 μm. The surface roughness of the light guide plate 2 in the resulting molded article is improved by the polishing, so that the light guide plate 2 can be obtained as a high-luminance light guide plate.

The obtained stamper 28 for molding is positioned and fixed accurately, for example, in a predetermined position of the mold of the injection molding equipment by magnetic or vacuum chucking, or the like, so that light guide plates 2 are produced continuously and efficiently by a known injection molding method. Incidentally, light guide plates 2 may be molded also by any molding method such as compression molding, vacuum molding, or the like, other than the injection molding method.

Any suitable transparent plastic material may be used as a material constituting the light guide plate 2. Specific examples of the material include an acrylic plastic material, a polycarbonate resin, a polyacetal resin, a polyolefin resin, and an ultraviolet-curable plastic material. Among these materials, the acrylic plastic material is particularly suitable for the light guide plate 2 according to the present invention because the material is excellent in transparency, cost and moldability.

Figure 15:
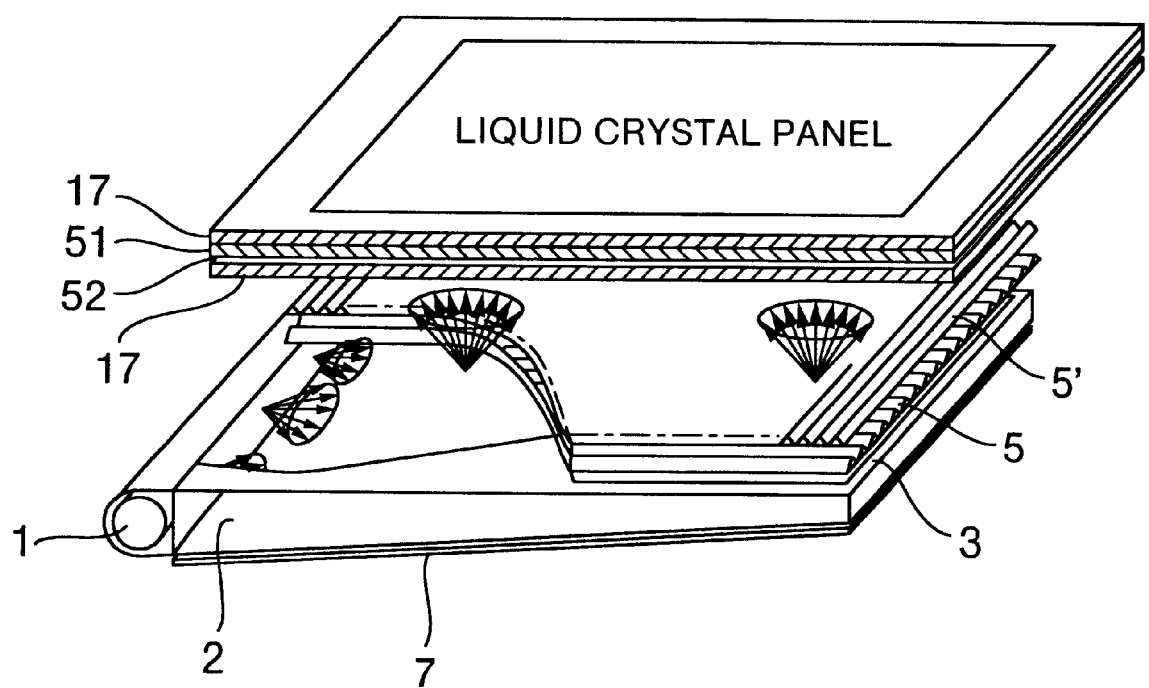
FIG. 15 is an explanatory view showing an example of the configuration of the back-lighting type liquid crystal display device according to the present invention.

FIG. 15 is a typical view showing the configuration of a back-lighting type liquid crystal display device according to an embodiment of the present invention. A diffusing sheet 3, prism sheets 5 and 5', a polarizing plate 17, a liquid crystal cell array 51, a color filter 52 and a polarizing plate 17 are disposed on an upper surface of the light guide plate 2 used as a constituent member of a back-lighting means. This configuration shows a general example of the liquid crystal display device, and various changes of the display device inclusive of a back-lighting portion may be made in accordance with the purpose of use of the display device.

For example, a desk-top display device or a television monitor for a personal computer requires a particularly wide view field angle. In this case, a diffusing plate for scattering illuminating light to widen the view field angle may be disposed newly in a suitable position (for example, on the uppermost surface of the liquid crystal panel) of the configuration shown in FIG. 15. Also a sheet having a light diffusing effect may be disposed to widen the view field angle or a light-transmissible surface may be processed to provide a light diffusing function so that the view field angle can be widened.

Incidentally, specific examples of the light source 1 used in the embodiments of the present invention include a cold cathode tube, a hot cathode tube, a tungsten lamp, a xenon lamp, a metal halide lamp, etc. Generally, a low-temperature light source such as a cold cathode tube is preferably used as the light source 1.

The liquid crystal element or cell array used in the embodiments of the present invention is not particularly limited. A known element array or panel may be used as the liquid crystal element or cell array. General examples of the liquid crystal cell array include a twist nematic type liquid crystal cell array, a super-twist nematic type liquid crystal cell array, a homogeneous type liquid crystal cell array, a thin-film transistor type liquid crystal cell array, an active matrix driving type liquid crystal cell array, a simple matrix driving type liquid crystal cell array, etc.

Although the embodiments of the present invention have been described mainly with reference to the drawings, it need hardly be said to those skilled in the art that various changes may be made without departing from the spirit of the present invention.

As described above, in accordance with the embodiments of the present invention, a light guide plate which can achieve improvement of back-lighting or front-lighting luminance without increase of luminance of a light source can be provided and a liquid crystal display device using the light guide plate can be provided. Further, in accordance with the embodiments of the present invention, a light guide plate which is free from generation of moire and high in light utilizing efficiency and which has stable characteristic without occurrence of luminance irregularity can be achieved and a liquid crystal display device using the light guide plate can be achieved. Further, in accordance with the embodiments of the present invention, high-performance light guide plates for liquid crystal display devices can be mass-produced inexpensively.

What is claimed is:

1. A liquid crystal display device comprising:
  a liquid crystal cell array;
  a light guide plate disposed on a rear or front side of said liquid crystal cell array and for lighting said liquid crystal cell array from the rear or front side; and
  a light source disposed on one side end face of said light guide plate and for radiating light from said one side end face of said light guide plate into said light guide plate,
  wherein a plurality of concave dots are formed in a surface of said light guide plate opposite to a light emitting surface of said light guide plate which emits light to said liquid crystal cell array so that light incident on said light guide plate from said light source is reflected at said concave dots in a direction toward said light emitting surface of said light guide plate, and
  wherein each of said concave dots is shaped like a triangle with a sectional inclination angle of from 50 to 60° in sectional view and shaped like an approximate rectangle or square in plan view in a direction perpendicular to said opposite surface of said light guide plate and disposed so that a long side of said approximate rectangle or a side of said approximate square is approximately parallel with a longitudinal direction of said light source.

2. A liquid crystal display device according to claim 1,
  wherein said approximate rectangle or square in each of said concave dots has short sides with a length of from 10 to 100 μm, and long sides with a length not smaller than 1.5 times as large as said short side length and not larger than 500 μm, and
  wherein each of said concave dots has a depth of from 2 to 100 μm.

3. A liquid crystal display device according to claim 1,
  wherein concave dots each having a shape other than that stated above are formed partially in the surface of said light guide plate opposite to said light emitting surface of said light guide plate.

4. A liquid crystal display device according to claim 1,
  wherein said concave dots are arranged individually at random over the whole light guide plate.

5. A liquid crystal display device according to claim 1,
  wherein the number of said concave dots per unit area in said light guide plate increases as said unit area is farther from said light source.

6. A liquid crystal display device according to claim 1,
  wherein the size of each of said concave dots in said light guide plate increases as said concave dot is farther from said light source.

7. A liquid crystal display device according to claim 1,
  wherein the number of said concave dots per unit area in said light guide plate as viewed along a direction parallel with the longitudinal direction of said light source increases as said unit area is farther from the center.

8. A liquid crystal display device according to claim 1,
  wherein the size of each of said concave dots in said light guide plate as viewed along a direction parallel with the longitudinal direction of said light source increases as said unit area is farther from the center.

9. A liquid crystal display device according to claim 1,
  wherein a thickness in a position of said light guide plate decreases as said position is farther from said light source.

10. A light guide plate into which light is introduced from a light source disposed on a side end face of said light guide plate,
  wherein a plurality of concave dots are formed in a surface of said light guide plate opposite to a light emitting surface of said light guide plate so that light incident on said light guide plate from said light source is reflected at said concave dots in a direction toward said light emitting surface of said light guide plate, and
  wherein each of said concave dots is shaped like a triangle with a sectional inclination angle of from 50 to 60° in sectional view and shaped like an approximate rectangle or square in plan view in a direction perpendicular to said opposite surface of said light guide plate and disposed so that a long side of said approximate rectangle or a side of said approximate square is approximately parallel with a longitudinal direction of said light source.

11. A light guide plate according to claim 10,
  wherein said approximate rectangle or square in each of said concave dots has short sides with a length of from 10 to 100 μm, and long sides with a length not smaller than 1.5 times as large as said short side length and not larger than 500 μm, and
  wherein each of said concave dots has a depth of from 2 to 100 μm.

12. A light guide plate according to claim 10,
  wherein concave dots each having a shape other than that stated above are formed partially in the surface of said light guide plate opposite to said light emitting surface of said light guide plate.

13. A light guide plate according to claim 10,
  wherein said concave dots are arranged individually at random over the whole light guide plate.

14. A light guide plate according to claim 10,
  wherein the number of said concave dots per unit area in said light guide plate increases as said unit area is farther from said light source.

15. A light guide plate according to claim 10,
  wherein the size of each of said concave dots in said light guide plate increases as said concave dot is farther from said light source.

16. A light guide plate according to claim 10,
  wherein the number of said concave dots per unit area in said light guide plate as viewed along a direction parallel with the longitudinal direction of said light source increases as said unit area is farther from the center.

17. A light guide plate according to claim 10,
  wherein the size of each of said concave dots in said light guide plate as viewed along a direction parallel with the longitudinal direction of said light source increases as said unit area is farther from the center.

18. A light guide plate according to claim 10,
  wherein a thickness in a position of said light guide plate decreases as said position is farther from said light source.

19. A method for producing a light guide plate according to claim 10, comprising the steps of:
- (a) applying a photo resist onto a silicon crystal substrate covered with a silicon oxide film, and then forming a pattern of said concave dots on said photo resist by photolithography;
- (b) etching said silicon oxide film with said photo resist as a mask, and then removing said photo resist;
- (c) forming said concave dots in said silicon crystal substrate by anisotropically etching said silicon substrate with said silicon oxide film as a mask, and then removing said silicon oxide film;
- (d) forming a metal film as a base of plating on said silicon crystal substrate, plating said silicon crystal substrate with nickel by use of said metal film as an electrode to thereby form a master stamper of a nickel plating sheet, and then separating said master stamper from said silicon crystal substrate;
- (e) forming a mother stamper by plating said master stamper, and then separating said mother stamper from said master stamper;
- (f) forming a stamper for molding by plating said mother stamper, and then separating said molding stamper from said mother stamper; and
- (g) attaching said molding stamper to a molding equipment, and producing said light guide plate by molding.

* * * * *